(12) United States Patent
Kadav et al.

(10) Patent No.: US 11,741,712 B2
(45) Date of Patent: Aug. 29, 2023

(54) MULTI-HOP TRANSFORMER FOR SPATIO-TEMPORAL REASONING AND LOCALIZATION

(71) Applicant: NEC Laboratories America, Inc., Princeton, NJ (US)

(72) Inventors: Asim Kadav, Mountain View, CA (US); Farley Lai, Santa Clara, CA (US); Hans Peter Graf, South Amboy, NJ (US); Alexandru Niculescu-Mizil, Plainsboro, NJ (US); Renqiang Min, Princeton, NJ (US); Honglu Zhou, Somerset, NJ (US)

(73) Assignee: NEC Corporation

( * ) Notice: Subject to any disclaimer, the term of this patent is extended or adjusted under 35 U.S.C. 154(b) by 177 days.

(21) Appl. No.: 17/463,757

(22) Filed: Sep. 1, 2021

(65) Prior Publication Data
US 2022/0101007 A1 Mar. 31, 2022

Related U.S. Application Data

(60) Provisional application No. 63/084,066, filed on Sep. 28, 2020.

(51) Int. Cl.
*G06V 20/40* (2022.01)
*G06T 7/73* (2017.01)
(Continued)

(52) U.S. Cl.
CPC ............ *G06V 20/41* (2022.01); *G06F 18/213* (2023.01); *G06N 3/045* (2023.01); *G06T 7/246* (2017.01);
(Continued)

(58) Field of Classification Search
CPC .... G06V 20/41; G06V 20/46; G06V 2201/07; G06V 10/82; G06V 10/62; G06F 18/213;
(Continued)

(56) References Cited

U.S. PATENT DOCUMENTS

| 9,154,158 B2 | 10/2015 | Desappan et al. |
| 2002/0122598 A1 | 9/2002 | Ribas-Corbera et al. |

(Continued)

FOREIGN PATENT DOCUMENTS

| KR | 20190024689 | * | 3/2019 | ............. G06V 10/82 |

*Primary Examiner* — Amara Abdi
(74) *Attorney, Agent, or Firm* — Joseph Kolodka

(57) ABSTRACT

A method for using a multi-hop reasoning framework to perform multi-step compositional long-term reasoning is presented. The method includes extracting feature maps and frame-level representations from a video stream by using a convolutional neural network (CNN), performing object representation learning and detection, linking objects through time via tracking to generate object tracks and image feature tracks, feeding the object tracks and the image feature tracks to a multi-hop transformer that hops over frames in the video stream while concurrently attending to one or more of the objects in the video stream until the multi-hop transformer arrives at a correct answer, and employing video representation learning and recognition from the objects and image context to locate a target object within the video stream.

20 Claims, 7 Drawing Sheets

(51) Int. Cl.
  *G06T 7/246* (2017.01)
  *G06F 18/213* (2023.01)
  *G06N 3/045* (2023.01)

(52) U.S. Cl.
  CPC ............... *G06T 7/73* (2017.01); *G06V 20/46* (2022.01); *G06T 2207/10016* (2013.01); *G06T 2207/20081* (2013.01); *G06T 2207/20084* (2013.01); *G06V 2201/07* (2022.01)

(58) Field of Classification Search
  CPC .......... G06N 3/045; G06N 3/08; G06T 7/246; G06T 7/73; G06T 2207/10016; G06T 2207/20081; G06T 2207/20084
  See application file for complete search history.

(56) References Cited

U.S. PATENT DOCUMENTS

| | | |
|---|---|---|
| 2010/0027663 A1 | 2/2010 | Dai et al. |
| 2011/0081048 A1* | 4/2011 | Woo .......................... G06T 7/12 382/103 |
| 2015/0043661 A1 | 2/2015 | Okada |
| 2019/0024689 A1* | 1/2019 | Sabau ................ B23K 26/0622 |
| 2019/0188456 A1* | 6/2019 | Shibata ................ G06V 10/757 |
| 2020/0117906 A1* | 4/2020 | Lee ...................... G06V 10/764 |
| 2021/0103742 A1* | 4/2021 | Adeli-Mosabbeb ... G06V 40/10 |
| 2021/0256977 A1* | 8/2021 | Wang ...................... G06V 10/82 |
| 2022/0101628 A1* | 3/2022 | Sun ........................ G06V 10/25 |

* cited by examiner

MULTI-HOP TRANSFORMER FOR SPATIO-TEMPORAL REASONING AND LOCALIZATION

RELATED APPLICATION INFORMATION

This application claims priority to Provisional Application No. 63/084,066, filed on Sep. 28, 2020, the contents of which are incorporated herein by reference in their entirety.

BACKGROUND

Technical Field

The present invention relates to localization of objects in videos and, more particularly, to a multi-hop transformer for spatio-temporal reasoning and localization.

Description of the Related Art

Reasoning, algebraically manipulating previously acquired knowledge to answer a new question, is the core of the next milestone in artificial intelligence. Moving from perception and statistical mapping to deliberate thinking and non-superficial understanding, building models that can reason will help address limitations of current learning-based systems.

SUMMARY

A method for using a multi-hop reasoning framework to perform multi-step compositional long-term reasoning is presented. The method includes extracting feature maps and frame-level representations from a video stream by using a convolutional neural network (CNN), performing object representation learning and detection, linking objects through time via tracking to generate object tracks and image feature tracks, feeding the object tracks and the image feature tracks to a multi-hop transformer that hops over frames in the video stream while concurrently attending to one or more of the objects in the video stream until the multi-hop transformer arrives at a correct answer, and employing video representation learning and recognition from the objects and image context to locate a target object within the video stream.

A non-transitory computer-readable storage medium comprising a computer-readable program for using a multi-hop reasoning framework to perform multi-step compositional long-term reasoning is presented. The computer-readable program when executed on a computer causes the computer to perform the steps of extracting feature maps and frame-level representations from a video stream by using a convolutional neural network (CNN), performing object representation learning and detection, linking objects through time via tracking to generate object tracks and image feature tracks, feeding the object tracks and the image feature tracks to a multi-hop transformer that hops over frames in the video stream while concurrently attending to one or more of the objects in the video stream until the multi-hop transformer arrives at a correct answer, and employing video representation learning and recognition from the objects and image context to locate a target object within the video stream.

A system for using a multi-hop reasoning framework to perform multi-step compositional long-term reasoning is presented. The system includes a memory and one or more processors in communication with the memory configured to extract feature maps and frame-level representations from a video stream by using a convolutional neural network (CNN), perform object representation learning and detection, link objects through time via tracking to generate object tracks and image feature tracks, feed the object tracks and the image feature tracks to a multi-hop transformer that hops over frames in the video stream while concurrently attending to one or more of the objects in the video stream until the multi-hop transformer arrives at a correct answer, and employ video representation learning and recognition from the objects and image context to locate a target object within the video stream.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
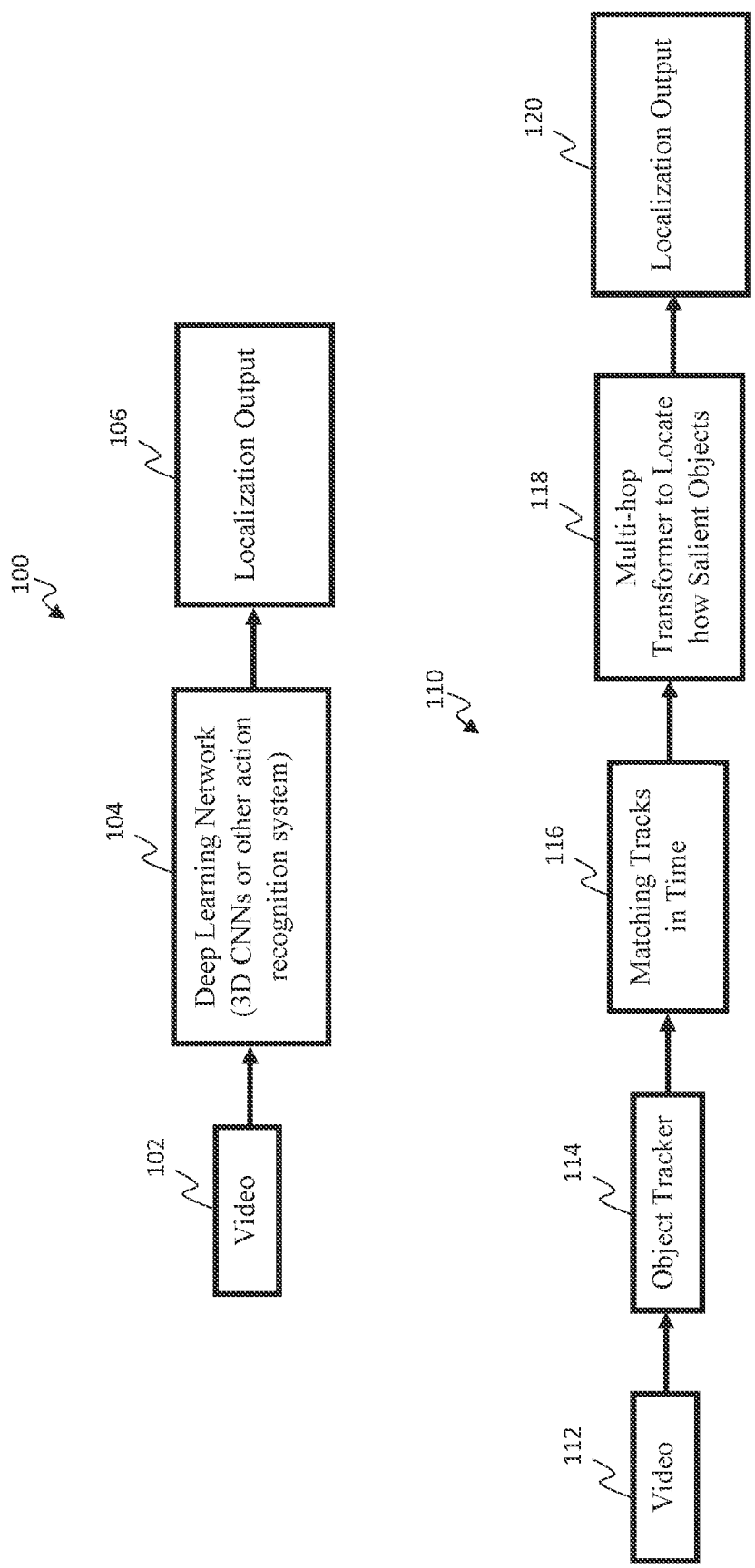
FIG. 1 is a block/flow diagram of a comparison between a conventional system and the exemplary system employing the multi-hop transformer, in accordance with embodiments of the present invention.

Learning and reasoning are two essential abilities associated with intelligence. Between the two, the statistical nature of learning is much more well understood and marks the major progress in artificial intelligence over the last decades. Plenty of machine learning methods were developed to solve tasks by learning the statistical correlation in the data. However, machines with solely the ability to map correlation and learn have non-negligible drawbacks. For instance, they can be easily fooled by statistical spurious patterns and undesirable dataset biases. Moreover, in another example, researchers have found that models can recognize the action, e.g., "swimming" even when the actor is masked out, because the models relied on the blue swimming pool, the scene bias, instead of the dynamics of the actor. Such models are limited in interpretability, robustness, versatility, soundness, and generalization, and thus unfavorable. On the other hand, the nature of reasoning has proven to be more elusive and nearer to the core of intelligence.

Reasoning, for humans, is the ability to manipulate knowledge entities in terms of relations. Humans are subconsciously performing reasoning all the time. For example, instead of just recognizing objects, humans will form an understanding of relations between them. Humans have to reason about the meaning behind the static objects (such as traffic lights and road signs), how the pedestrians and cars move and predict where they will move, to decide on how to navigate. Reasoning is also performed when a human analyzes security-camera footage recorded on the porch to decide whether the person in the video is stealing packages or making a delivery. Analogous to human reasoning, machine reasoning can be defined as "algebraically manipulating previously acquired knowledge in order to answer a new question." Moving from perception to deliberate thinking and true understanding, a shift from machine learning-centric AI to machine reasoning-centric AI has been observed.

Though the quest to common sense and reasoning has drawn heated attention, a model with the ability to perform spatiotemporal reasoning and video understanding is non-existent. In that regard, the exemplary embodiments advance neural reasoning for complex problem solving, specifically on the task of video understanding. Video understanding requires spatiotemporal reasoning. For example, in order to detect shoplifting from a real-time surveillance video, a model first has to recognize persons and items. Second, the model must have the ability to recognize atomic actions such as "walk around," "hold an item," "put an item into pocket," "checkout," and "walk out of the store." This would implicitly require constructing a vision system that implements object permanence. Most importantly, the model has to recognize the temporal order of these actions and reason about the relations and logics between these actions. To enable such high-level video understanding, the exemplary embodiments introduce Hopper, an advanced video understanding framework that flexibly deploys knowledge and performs spatiotemporal reasoning.

Hopper is developed to apply the CATER task. The CATER task involves Snitch Localization under occlusion and containment, which is the flagship task and the most difficult one in CATER that tests a model's ability to recognize the effect of actions on the environment. As a diagnostic dataset to analyze modern spatiotemporal video architecture, the CATER Snitch Localization task is analogous to the cups-and-balls trick, e.g., objects are moving simultaneously including a special object (snitch) and at least one container (cone), and the task is to determine the location of snitch in the end of the video while the snitch can be occluded or contained (e.g., hidden inside of) by another object. Conventional video architectures struggle to perform well on this task due to the lack of the high-level spatiotemporal understanding ability. Hopper, as a video understanding framework, includes a Multi-hop Transformer for alleviating such issues.

Hopper includes multistep compositional long-term reasoning, e.g., humans would think in steps (multi-step) and understand the world as a sum of its parts (compositional), thus it might be crucial to encourage multi-step compositional reasoning for an intelligent model, e.g., token-based object centric learning, because humans usually think in terms of entities and relations between them, humans are inclined to token-based object-centric learning, e.g., tracking-enabled video recognition, that is, the exemplary embodiments incorporate tracking into the system because tracking can aggregate sequence features in time order and give consistent feature representations, and, e.g., end-to-end automatic neural reasoning. The exemplary embodiments rely on neural reasoning and attention modeling because neural networks are automatic, efficient and have good generalization capabilities, even though symbolic logical reasoning can do rich multistep inference. The exemplary model automatically performs an explicit, end-to-end, and sound multi-step spatiotemporal reasoning procedure to handle the compositional and structured nature of long-term video understanding. This is achieved by iteratively running a Multi-hop Transformer.

The Multi-hop Transformer has the ability to reason by hopping over frames in the video while "consciously" selecting objects in the video, until the Multi-hop Transformer arrives at the correct answer (target object). The exemplary embodiments run multiple iterations over a single layer of the Multi-hop Transformer with a while loop. Every iteration performs one hop of reasoning by choosing certain objects in a certain frame. The hops, that is, iterations, operate in an auto-regressive manner. The number of hops is automatically discovered and varies across videos. The Multi-hop Transformer guides the combinations of learned representations through the iterative design, as well as the multi-head and conditioning attention mechanism, which are essentially composition rules that provide good and right inductive biases and lead to higher forms of reasoning. Hopper, centered by this Multi-hop Transformer, is designed to enrich the algebraic structural priors to address hard problem-solving tasks.

Hopper performs multi-step reasoning automatically with interpretability. This appears to be the first method to enable a structured, automatic, iterative, and chained reasoning process for non-trivial video understanding. Instead of learning from short clips, the proposed model takes in the whole video and has end-to-end differentiability. The exemplary embodiments demonstrate the model's capability in multi-step compositional neural reasoning on the CATER dataset and achieve state-of-the-art performance with only 1 FPS (frames per second). After discovering that a model can solely look at the last frame to get a high accuracy on the CATER dataset, the exemplary embodiments built a more difficult dataset CATER-h to require true spatiotemporal reasoning for any model. The exemplary methods yield substantially higher predictive power. The results highlight the significance and value of multi-hop reasoning towards a high-level video understanding and machine intelligence.

With reference to FIG. 1, the task is given a video, and a query requesting the final location of an object in the video that may be hidden or occluded. The output of the system is the final coordinate or box where the object may reside.

System 100 describes existing work where a deep learning network 104 receives a video stream 102 to localize output 106. Often, due to entangled single representations, these systems 100 are unable to fully decipher or reason how objects move. As a result, such systems 100 often rely on bias like object shapes or occluders (that hide the object) and give that as a final output.

The system 110 shows the exemplary invention, where the Hopper first tracks objects via an object tracker 114 in frames received from a video stream 112. The Hopper builds a consistent representation by matching tracks 116 in time. A multi-hop transformer 118 is then employed that uses reasoning to trace back from an intermediate step where the object was fully visible towards the end of the video to fully locate the object or output 120.

Figure 2:
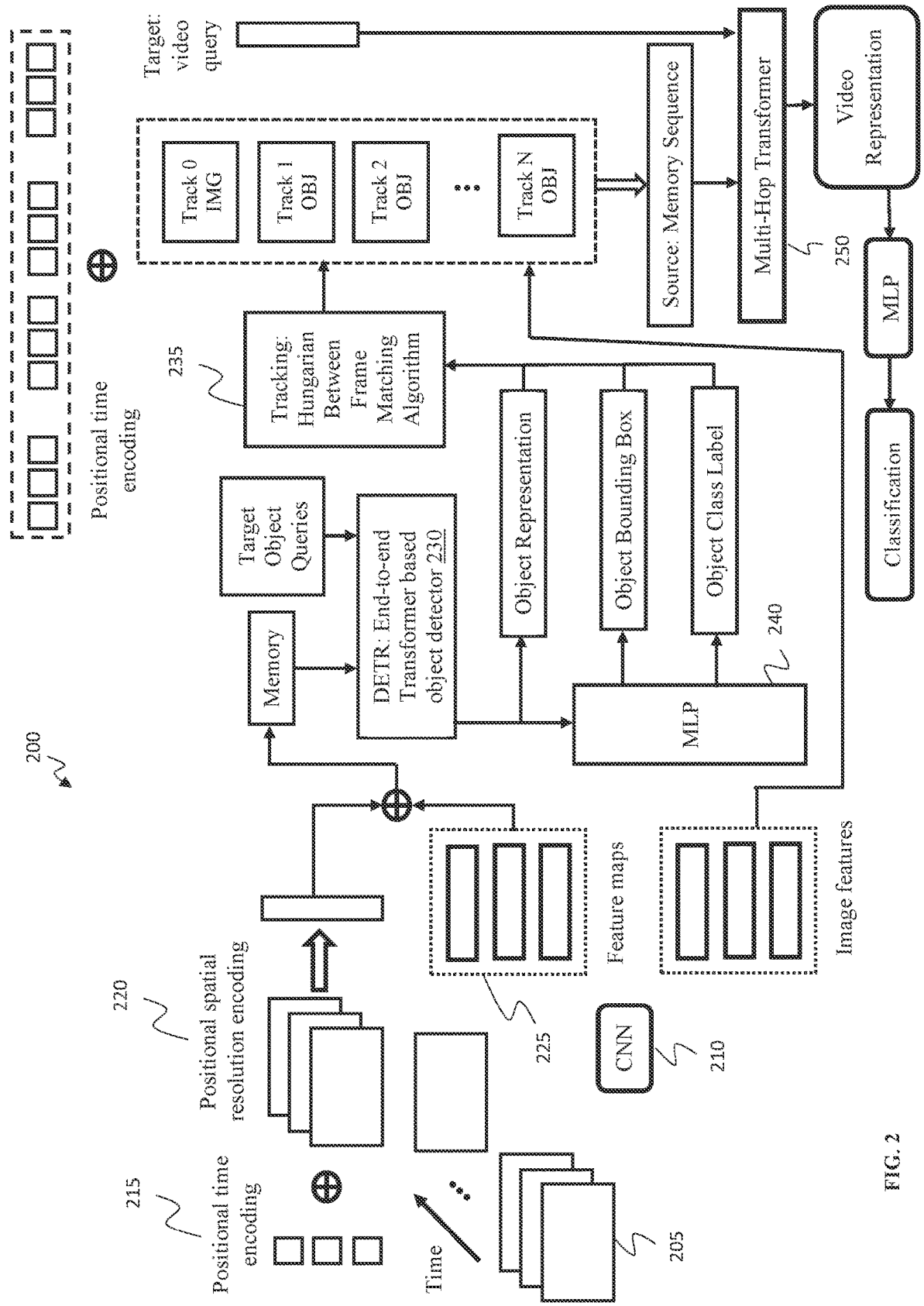
FIG. 2 is a block/flow diagram of an exemplary framework of the Hopper, in accordance with embodiments of the present invention.

With reference to FIG. 2, the framework of the Hopper 200 is illustrated, where a CNN 210 is utilized to extract frame-level feature representations from the video input or video stream 205. Positional time encodings 215 and resolution encodings 220 are learned and summed up with feature maps 225 from the CNN 210. Resulting representations, together with object queries, are forming the input to DETR 230, which is a transformer-based object detector. Tracking 235 is then performed by applying a Hungarian algorithm to match objects between every two consecutive frames. The N object tracks and the 1 track of image features from the CNN 210 are added with the learned positional time encoding 215 to form the memory input to the proposed Multi-hop Transformer 250, which further accepts a video query and produces the latent representation of the video. A multilayer perceptron (MLP) 240 takes in the video representation and performs the classification. Hopper 200 first obtains representations for the spatial context and every frame via the backbone or CNN 210. Object representations and object tracks are then computed to enable token-based object-centric learning for the Multi-hop Transformer 250.

Hopper 200 provides a framework to capture the essence of a video stream 205. Hopper 200 is inspired from the observation that humans usually think in terms of entities and relations between them and Hopper 200 achieves high performance through tracking-integrated object-centric learning and multi-step compositional long-term reasoning. Unlike traditional deep visual networks that perform processing over the pixels from which they learn and extract features, object-centric learning-based architectures have well defined parts to store information about entities through grouping and abstraction from the low-level information. Additionally, Hopper 200 combines both fine-grained (object representations) and coarse-grained (image representations) information, and thus is able to form a non-trivial contextual understanding of a video 205.

The exemplary embodiments illustrate the Hopper framework 200 in FIG. 2. As shown, Hopper 200 includes a CNN backbone 210 to extract frame-level representations from the video input 205, object representation learning and detection 215, 220, linking objects through time via tracking 235, and video representation learning and recognition from objects and image context (via Multi-hop Transformer 250).

Starting from the initial RGB-based video representation $x_v \in \mathbb{R}^{T \times 3 \times H_o \times W_o}$ where T represents the number of frames of the video, 3 is for the three color channels, $H_0$ and $W_0$ denote the original resolution height and width, a conventional CNN backbone 210 would extract feature map $f \in \mathbb{R}^{C \times H \times W}$ (225) and a compact image representation $c_t \in \mathbb{R}^C$ for every frame t. A 1×1 convolution reduces the channel dimension of f from C to a smaller dimension d, and a linear layer is used to turn the dimension of $c_t$ from C to d.

Regarding object detection and representation, the exemplary embodiments collapse the spatial dimensions into 1 dimension and combine the batch dimension with the temporal dimension for the feature map f Positional encodings 215 are learned for each time step (T in total) and each resolution (H×W in total), which are further added to the feature maps 225 in an element-wise manner, resulting in memory representations provided to the transformer encoder of DETR 230. DETR 230 is a transformer-based object detector for images. DETR 230 additionally accepts N embeddings of object queries for every image (assuming every image can at most have N objects) to the transformer decoder. The exemplary embodiments also combine the batch dimension with the temporal dimension. Outputs from DETR 230 are transformed object representations that are used as inputs to a MLP 240 to predict the bounding box and class label of every object (e.g., cone, snitch, etc.).

Regarding tracking 235, tracking 235 is essentially an association problem. An association between two objects respectively from consecutive two frames can be defined by the object class agreement and the difference of the two bounding boxes.

The exemplary embodiments denote $\hat{y}=[\hat{y}_t]_{t=1}^T$ as the predicted list of objects at all frames in the video 205, where $\hat{y}_t=[\hat{y}_t^i]_{i=1}^N$ denotes the predicted set of objects at frame t. Each element of the predicted object set at frame t can be seen as a 4-tuple:

$\hat{y}_t^i = (\hat{c}_t^i, \hat{b}_t^i, \{\hat{p}_t^i(c)|c \in C\}, \hat{o}_t^i)$, where $\hat{c}_t^i$ denotes the class label that has the maximum predicted likelihood for object i at frame t, $\hat{b}_t^i \in [0,1]^4$ is a vector that defines the bounding box top left and bottom right coordinates relative to the image size, $\hat{p}_t^i(c)$ denotes the predicted likelihood for class c, and $\hat{o}_t^i$ denotes the representation vector of this object i.

To obtain the optimal bipartite matching between the set of predicted objects at frame t and t+1, the exemplary embodiments search for a permutation of N elements $\sigma \in \mathfrak{S}_N$ with the lowest permutation cost:

$$\hat{\sigma} = \underset{\sigma \in \mathfrak{S}_N}{\operatorname{argmin}} \sum_{i=1}^N \mathscr{L}_{track}(\hat{y}_t^i, \hat{y}_{t+1}^{\sigma(i)})$$

where $\mathscr{L}_{track}$ is a pair-wise track matching cost between predicted object $\hat{y}_t^i$ (e.g., object i at frame t) and predicted object at frame t+1 with index σ(i) from the permutation a, denoted by $\hat{y}_{t+1}^{\sigma(i)}$. The optimal assignment is computed efficiently with the Hungarian algorithm.

The track matching cost at time t for object i is defined as:

$$\mathscr{L}_{track}(\hat{y}_t^i, \hat{y}_{t+1}^{\sigma(i)}) = -\lambda_c \mathbb{1}\{\hat{c}_t^i \neq \emptyset\} \hat{p}_{t+1}^{\sigma(i)}(\hat{c}_t^i) + \lambda_b \mathbb{1}\{\hat{c}_t^i \neq \emptyset\} \mathscr{L}_{box}(\hat{b}_t^i, \hat{b}_{t+1}^{\sigma(i)})$$

where $\mathbb{1}$ denotes an indicator function such that the equation after the symbol $\mathbb{1}$ only takes effect when the condition inside the { . . . } is true, otherwise the term will be 0. $\lambda_c, \lambda_b \in \mathbb{R}$ weight each term. $\mathscr{L}_{box}$ is defined as a linear combination of the $L_1$ loss and the generalized IoU loss. When the predicted class label of object i at frame t is not ∅, the exemplary embodiments aim to maximize the likelihood of the class label $\hat{c}_t^i$ for the predicted object σ(i) at frame t+1, and minimize the bounding box difference between the two. The total track matching cost of a video is the aggregation of $\mathscr{L}_{track}(\hat{y}_t^i, \vec{y}_{t+1}^{\sigma(i)})$ from object i=1 to N and frame t=1 to T−1.

Regarding video representation and recognition, the N object tracks obtained from the Hungarian algorithm and the 1 track of image features from the backbone CNN 210 are further added with the learned positional time encodings to form the memory input to the Multi-hop Transformer 250. Multi-hop Transformer 250 produces the final latent representation of the video $e \in \mathbb{R}^d$. A MLP takes in the video representation e and performs the recognition.

Figure 3:
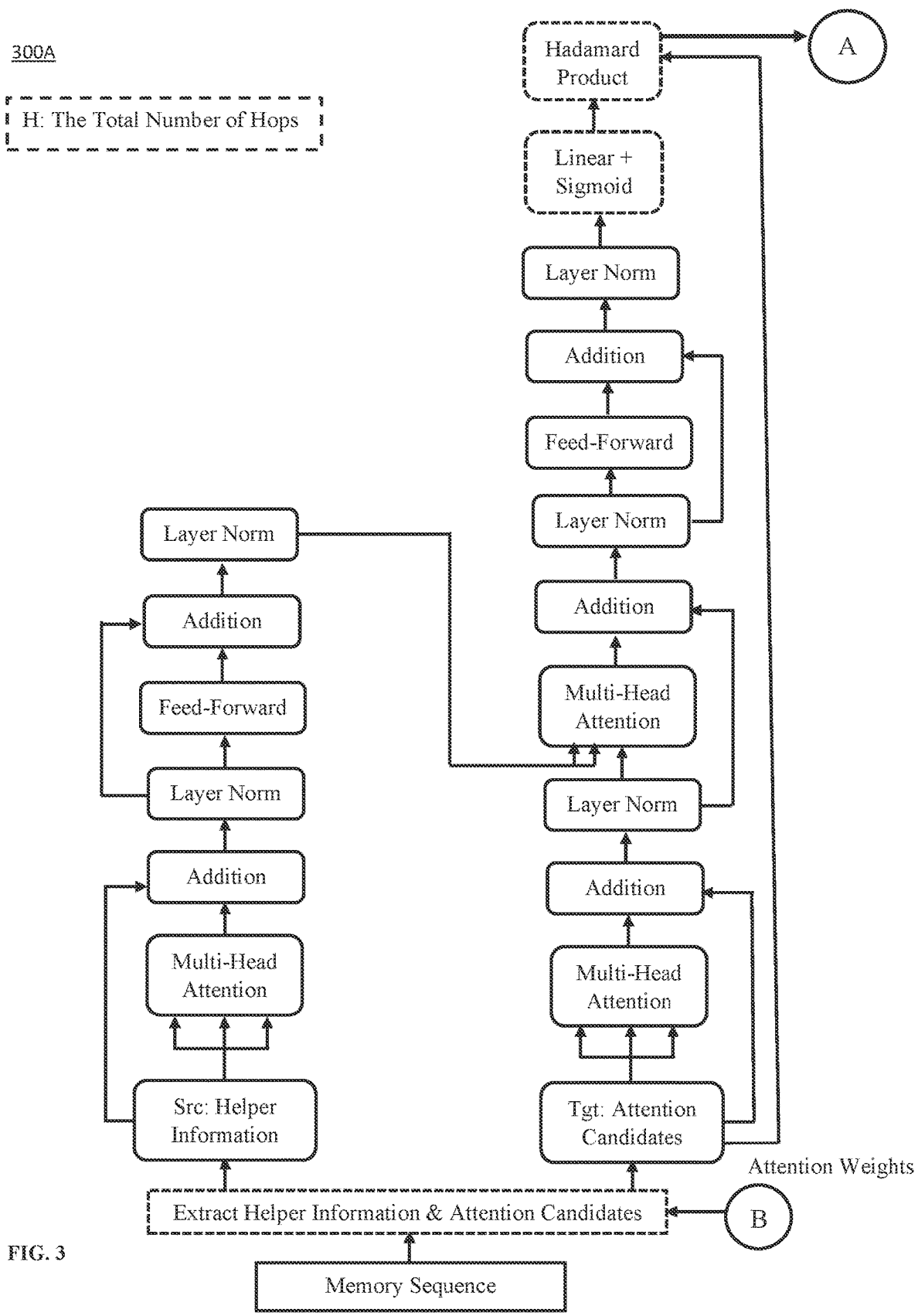
FIG. 3 is a block/flow diagram of a first portion of an exemplary architecture of the multi-hop transformer, in accordance with embodiments of the present invention.
Figure 4:
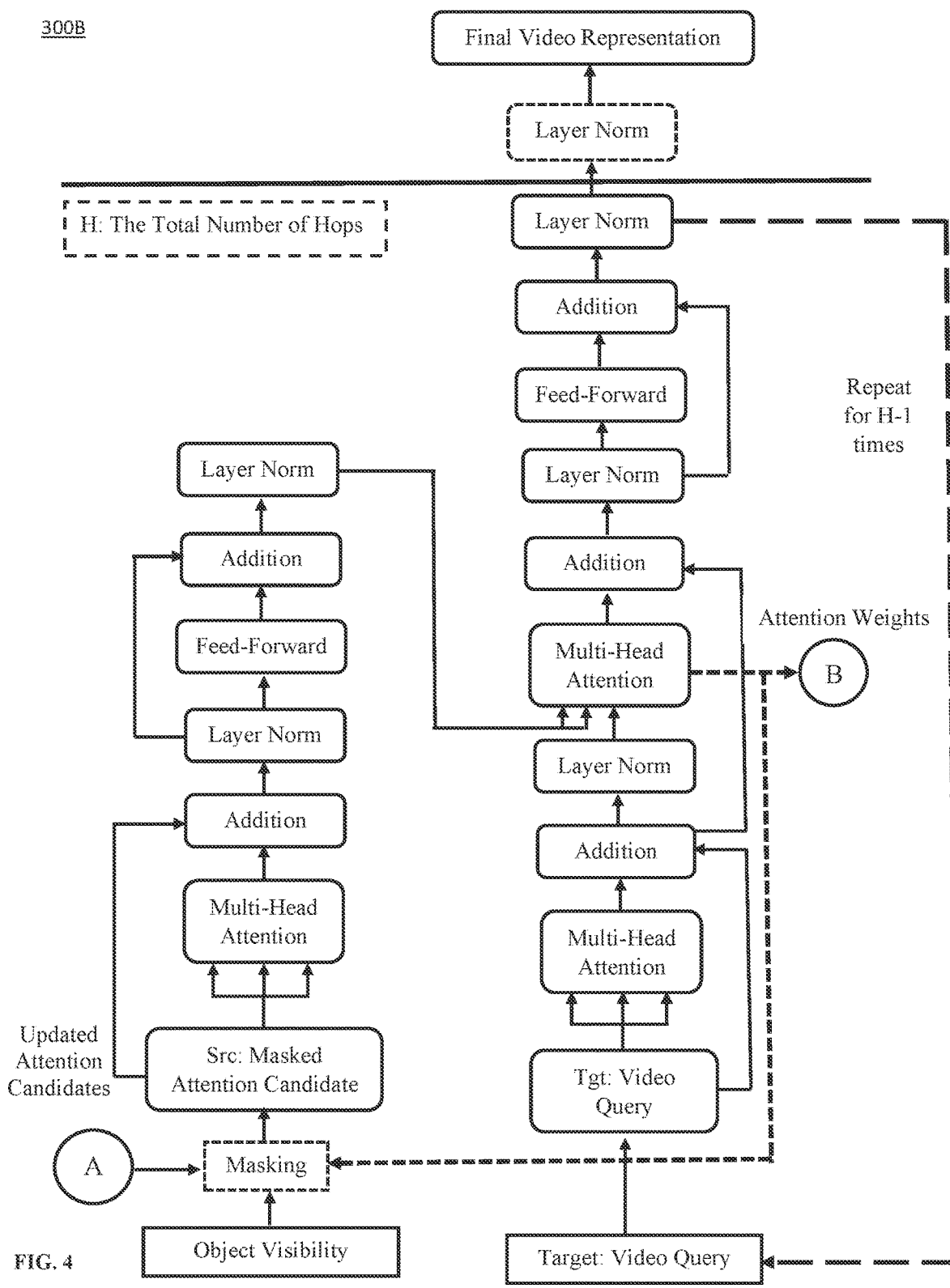
FIG. 4 is a block/flow diagram of a second portion of the exemplary architecture of the multi-hop transformer, in accordance with embodiments of the present invention.

Regarding the Multi-hop Transformer 250, the exemplary embodiments depict the Multi-hop Transformer 250 in FIGS. 3 and 4. Architecture 300A communicates with architecture 300B. The overall module is described in Algorithm 1 in pseudo-code, and notations are defined as follows: frame track $\mathcal{T}_f$: $[c_1, c_2, \ldots, c_T]$, object track $\mathcal{T}_o$: $[o_1^1, o_2^1, \ldots, o_T^1, o_1^2, o_2^2, \ldots, o_T^2, \ldots, o_1^N, o_2^N, \ldots, o_T^N]$, memory sequence M: $[\mathcal{T}_f \| \mathcal{T}_o]$ target video query embedding ε, object visibility map $\mathcal{V}$, helper information $\mathcal{H}$, attention candidate $\mathcal{U}$, and attention weights $\mathcal{A}$.

Multi-hop transformer accepts a frame track $\mathcal{T}_f$, an object track $\mathcal{T}_o$, an object visibility map $\mathcal{V}$ sequence, a target video query embedding ε, the number of objects N and number of frames T as input. $\mathcal{V}$ is determined by a heuristic criterion: an object is visible if the bounding box of the object is not completely contained by any bounding box of another object in that frame.

As shown in Algorithm 1, reproduced below, the Multi-hop Transformer 250 has two traditional encoder-decoder transformer units, Transformer$_f$ and Transformer$_s$.

Technically, the transformer could be defined as tgt_updated, attention_weights Transformer(tgt, src).

---

Algorithm 1 Multi-hop Transformer module.

---

Input: $\mathcal{T}_f \in \mathbb{R}^{T \times d}$, $\mathcal{T}_o \in \mathbb{R}^{NT \times d}$, $\mathcal{V} \in \mathbb{R}^{NT \times 1}$, $\varepsilon \in \mathbb{R}^{1 \times d}$,
$N \in \mathbb{R}, T \in \mathbb{R}$
Params: LayerNorm, Transformer$_f$, Transformer$_s$, W$_g$, b$_g$
1:     hop ← 1, index ← 0, time ← index%T
2:     while time ≠ (T − 1) do
3:         if hop > 1 then
4:             $\mathcal{H}, \mathcal{U}$ ← Extract ($\mathcal{T}_o$, N, T, time)
5:         else
6:             $\mathcal{H} \leftarrow \mathcal{T}_f$, $\mathcal{U} \leftarrow \mathcal{T}_o$
7:         end if
8:         $\mathcal{U}_{update}$ ← Transformer$_f$ ($\mathcal{U}$, $\mathcal{H}$)
9:         $\mathcal{U}_{update}$ ← Sigmoid (W$_g$ · $\mathcal{U}_{update}$ + b$_g$) ⊙ $\mathcal{U}$
10:        $\mathcal{U}_{update}$ ← Masking ($\mathcal{U}_{update}$, $\mathcal{V}$, time)
11:        ε, $\mathcal{A}$ ← Transformer$_s$ ($\mathcal{U}_{update}$, ε)
12:        index ← Softargmax ($\mathcal{A}$)
13:        time ← index%T
14:        hop ← hop+1
15:    end while
16:    e ← LayerNorm ( ε )
Return e

---

Multi-hop Transformer 250 has the ability to reason by hopping over frames while selectively attending to object(s) in the frame, until the Multi-hop Transformer 250 arrives at the correct answer (e.g., object of a certain frame that is the most important for video recognition). Particularly, the exemplary methods apply multiple iterations over the Multi-hop Transformer 250, and each performs one hop of reasoning by attending to certain object(s) in a particular frame through multiheaded attention. With a total of H iterations (hops), the model would attend to objects in H critical frames to form the representation of the video. As the complexity of video varies, H also varies across videos. The exemplary embodiments constrain the hops to operate in an autoregressive manner. Hence, if hop h mostly attends to object(s) at frame t, then hop h+1 could only attend object(s) in frames after frame t. The hopping ends when Multi-hop Transformer 250 has attended to object(s) in the last frame (line 2 in Algorithm 1).

Transformer$_f$ extracts useful information from the memory sequence M and Transformer$_s$ learns the latent representation of the target video by attentively utilizing the information. Thus, from the memory sequence, Multi-hop Transformer 250 would first obtain the attention candidates $\mathcal{U}$ (e.g., representations of certain objects) and helper information $\mathcal{H}$, which are representations that are crucial to help decide on whom to attend in this hop. Hop 1 has different $\mathcal{H}$ and $\mathcal{U}$ (line 6 in Algorithm 1), and this is because hop 1 is necessary for all videos with the goal to find the first critical object(s) and frame from the global information. Transformer$_f$ takes in $\mathcal{U}$ as tgt and $\mathcal{H}$ as src, then produces U$_{update}$, an updated version of $\mathcal{U}$, by selectively attending to $\mathcal{H}$ and conditionally integrating helper-fused representations of the attention candidates to the original representations $\mathcal{U}$. The conditional integration is achieved by Attentional Feature-based Gating (line 9 in Algorithm 1). The functionality of Transformer$_s$ is to learn representation of the video by attending to the updated and masked representations of the attention candidates (line 11 in Algorithm 1).

Masking( ) helps the model to solely consider the visible objects as well as implements the autoregressive operation when the current hop is not hop 1. For hop 2 to the last one, Extrac( ) returns $\mathcal{H}$ as the set of representations of all objects in the frame that the previous hop attended to, and Masking( ) makes sure the attention candidates for Transformer$_s$ are visible objects in frames after the frame that the previous hop attended to. The indices of the most attended object and frame are determined by attention weights $\mathcal{A}$ from the previous hop with a differentiable Softargmax( ).

With Transformer$_f$, Transformer$_s$, and the novel hopping mechanism, Multi-hop Transformer 250 decides on which object(s) (in the sequence of attention candidates $\mathcal{U}$) to attend to given the current representation of the video ε by reasoning about the relations between the elements in the set of attention candidates, as well as how would each attention candidate relate to the helper information $\mathcal{H}$.

These structural priors (e.g., attention, which could be treated as a soft tree) that are embedded in, essentially provide the composition rules that algebraically manipulate the previous acquired knowledge, and serve as good and right inductive biases and lead to the higher forms of reasoning.

Regarding training the following training methods are outlined:

Dynamic hop stride, that is, the exemplary embodiments let the model atomically decide on which upcoming frame to reason instead of strictly setting the per-hop frame stride to 1.

Minimal hops of reasoning, that is, the exemplary embodiments set the minimal number of hops that the model has to do for any video as 5 (empirically set) to encourage the learning of reasoning through reasonably large number of hops (unless not possible, e.g., video whose last visible snitch is in the second last frame).

Auxiliary hop 1 object loss, that is, the exemplary embodiments define the cross entropy of the classifying index of the computed last visible snitch. Inputs to this loss are the index of the last visible snitch from To, as well as the attention weights from Transformer$_s$ of hop 1, serving as a predicted likelihood for each index class.

Auxiliary hop 2 object loss, that is, the exemplary embodiments define as the cross-entropy of the classifying index of the immediate occluder or container of the last visible snitch. Inputs to this loss are the heuristic 3 computed index and the attention weights from Transformer$_s$ of hop 2.

Auxiliary hop 1&2 frame loss, that is, the exemplary embodiments attend to the correct frames in hop 1 and 2 that is beneficial for the later hops. A L$_1$ loss term could guide the model to find out the correct frame index.

Teacher forcing, that is, the exemplary embodiments can employ this strategy used for quickly and efficiently training recurrent neural networks that uses the ground truth from a prior time step as input. The exemplary embodiments use teacher forcing for hop 2 by providing the ground truth $\mathcal{H}$ and $\mathcal{U}$ during the training phase.

Contrastive debias loss via masking out, that is, the exemplary embodiments employ this to allow a penalty for the model if it could make a prediction correctly when the most attended object in the last frame is masked out. The intuition here is that model should not be able to predict a correct location without seeing the correct evidence.

Technically, the contrastive debias loss is defined as the entropy function that the exemplary embodiments hope to maximize, defined as follows:

$$\mathscr{L}_{debias} = \mathbb{E}\left[\sum_{k=1}^{K} g_\theta(\mathcal{M}_{neg}:\cdots)(\log g_\theta(\mathcal{M}_{neg}:\cdots))\right]$$

where $\mathcal{M}_{neg}$ is the memory sequence to the Multi-hop Transformer 250 with the last most attended object being masked out by zeros, K denotes the number of grid classes, and $g_\theta$ denotes the video representation and recognition module (Multi-hop Transformer 250 along with MLP) with parameter θ that produces the likelihood of each grid class. This contrastive debias loss induces the latent space to capture information that is maximally useful to the final classification task.

Regarding the CATER-H dataset, CATER provides a diagnostic video dataset that requires long-term spatio understanding and temporal reasoning to be solved. CATER is built against models that take advantage of implicit wrong dataset biases and ignore meaningful variations of the spatiotemporal structure of the video. With fully observable and controllable scene biases, the 5, 500 videos in CATER are rendered synthetically at 24 FPS (300-frame 320×240px) using a library of standard 3D objects, that is, 193 different object classes in total which includes 5 object shapes (cube, sphere, cylinder, cone, snitch) in 3 sizes (small, medium, large), 2 materials (shiny metal and matte rubber) and 8 colors. Every video has a small metal snitch. There is a large "table" plane on which all objects are placed. At a high level, the dynamics in CATER videos are analogous to the cup-and-balls magic routine. A subset of 4 atomic actions ('rotate', 'pick-place', 'slide' and 'contain') is afforded by each object.

Note that 'contain' is only afforded by cone and recursive containment is possible, e.g., a cone can contain a smaller cone that contains another object. Every video in CATER is split into several time slots, and every object in this video randomly performs an action in the time slot (including 'no action'). Objects and actions vary across videos. The "table" plane is divided into 6×6 grids (36 rectangular cells), and the Snitch Localization task is to determine the grid that the snitch is in at the end of the video, as a single-label classification task. The task implicitly requires the understanding of object permanence because objects could be occluded or contained (hidden inside of) by another object.

The Snitch Localization task is more challenging if the snitch is contained by another object in the end. Inspired by this finding, the exemplary embodiments plot the histogram of the frame index of the last visible snitch for every video in CATER. The CATER dataset is highly imbalanced for the Snitch Localization task in terms of the temporal cues. For example, in CATER, snitch is entirely visible at the end of the video for 58% of the samples. This indicates that a model could obtain a relatively good accuracy by simply "looking" at the last frame instead of the entire video. Such dataset characteristic is unfavored because it is against the original design purpose of CATER, e.g., providing a diagnostic tool that requires long-term temporal reasoning. Intuitively, even for humans, the Snitch Localization task is harder when the snitch is not visible earlier in the video. As a result, the exemplary embodiments built a new dataset, CATERhard (or CATER-h), as an unbiased dataset with diverse temporal variations that requires true spatiotemporal reasoning in order to be solved. In the histogram for CATER-h, every frame index roughly shares an equal number of videos to have the last visible snitch in that frame. CATER-h can avoid any model to achieve high performance by taking shortcut through only "looking" at the last few frames.

In summary, the exemplary embodiments use a multi-hop reasoning framework that can perform multi-step compositional long-term reasoning. The Multi-hop Transformer has the ability to reason by hopping over frames in the video while "consciously" attending to objects in the video, until the Multi-hop Transformer arrives at the correct answer to localize an object. The exemplary embodiments run multiple iterations over a single layer of the Multi-hop Transformer with a while loop. Every iteration performs one hop of reasoning by choosing certain objects in a certain frame. The hops (or iterations) operate in an auto-regressive manner. The number of hops is automatically discovered and varies across videos. Multi-hop Transformer guides the combinations of learned representations through the iterative design, as well as the multi-head and conditioning attention mechanism, which are essentially composition rules that provide good and right inductive biases and lead to higher forms of reasoning. Hopper, including the Multi-hop Transformer, is designed to enrich the algebraic structural priors to address spatio-temporal localization.

As a result, the exemplary embodiments of the present invention solve the problem of localization of objects in videos. The exemplary embodiments describe a spatio-temporal video reasoning system. Given a video (or video stream), and a query that requests the final location of a specific object in the video, the task is to locate the final location of the object in the video. The video includes a large number of objects or a person moving through time. It is quite challenging to localize the object within the video as it moves around in the video through occlusions or hides due through different camera angles. However, the Hopper framework including the Multi-hop Transformer of the exemplary embodiments aid in locating a target object within a video stream with great accuracy. Therefore, the exemplary embodiments propose an advanced neural model that flexibly deploys knowledge and performs spatiotemporal reasoning towards the high-level video understanding. Particularly, Hopper is a video understanding framework centered by a Multi-hop Transformer that performs a structured, automatic, iterative and chained reasoning process. Several practical training methods are also demonstrated such as teacher forcing and contrastive debiasing loss via masking out. The exemplary embodiments assess the proposed techniques on the CATER dataset to evaluate the ability in compositional long-term spatiotemporal reasoning. The exemplary embodiments find that a model can achieve a high performance by only utilizing the last few frames in CATER. Thus, a more difficult video dataset, CATER-h, is built as an unbiased dataset that requires true spatiotemporal reasoning.

Figure 5:
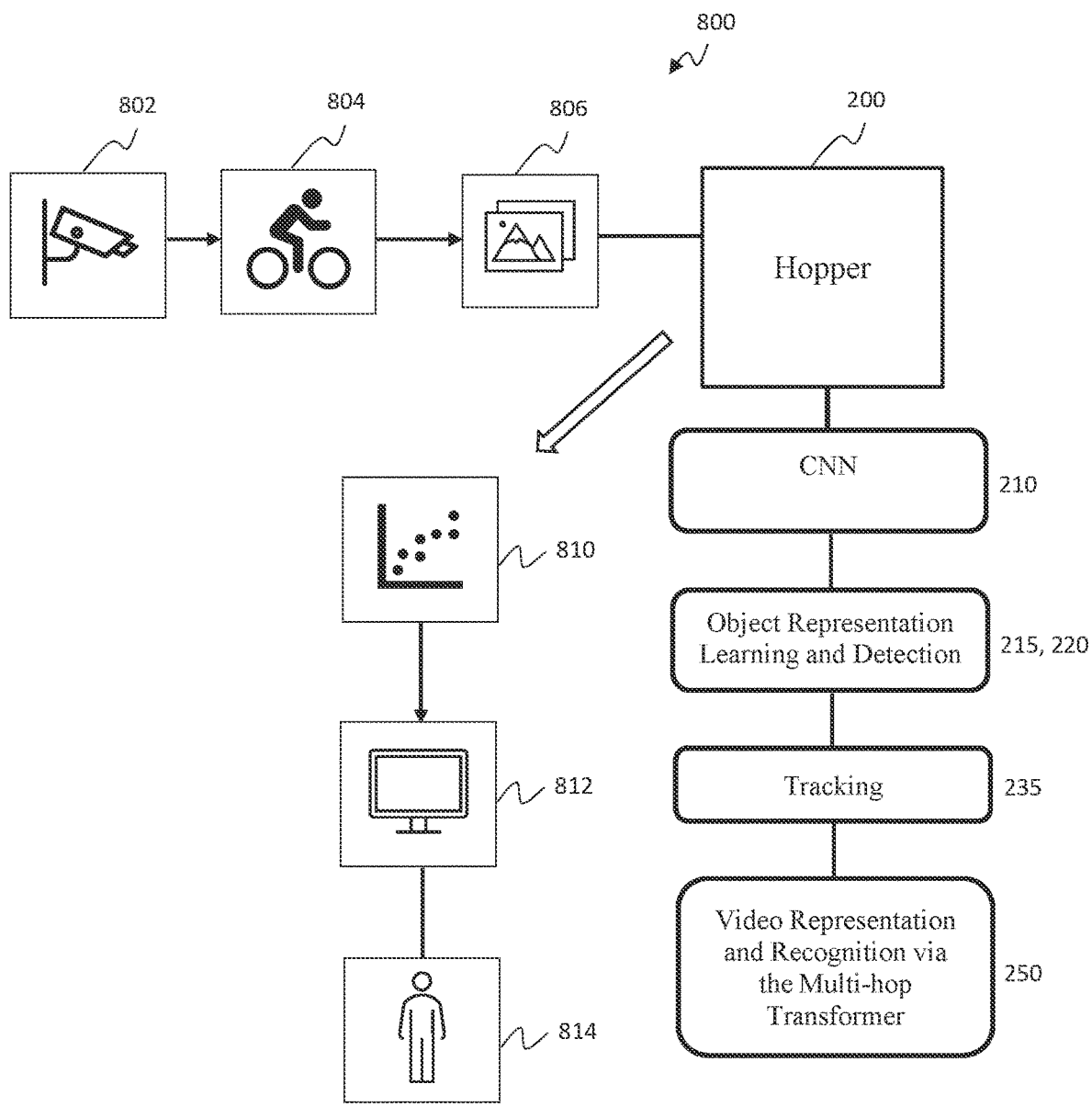
FIG. 5 is an exemplary practical application for employing the multi-hop transformer, in accordance with embodiments of the present invention.

FIG. 5 is a block/flow diagram 800 of a practical application for employing the multi-hop transformer, in accordance with embodiments of the present invention.

In one practical example, a camera 802 looks for an object 804 (e.g., person on a bike who potentially committed a crime) within a video stream 806. The exemplary methods employ the Hopper framework 200 via a CNN 210, object representation learning and detection 215, 220, tracking 235, and video representation and recognition via the Multi-hop Transformer 250. In one instance, Hopper 200 can select one or more frames (by hopping/skipping/jumping frames) to find the target object 804 within the video stream 806. The results 810 (e.g., all the frames with the target object 804) can be provided or displayed on a user interface 812 handled by a user 814.

Figure 6:
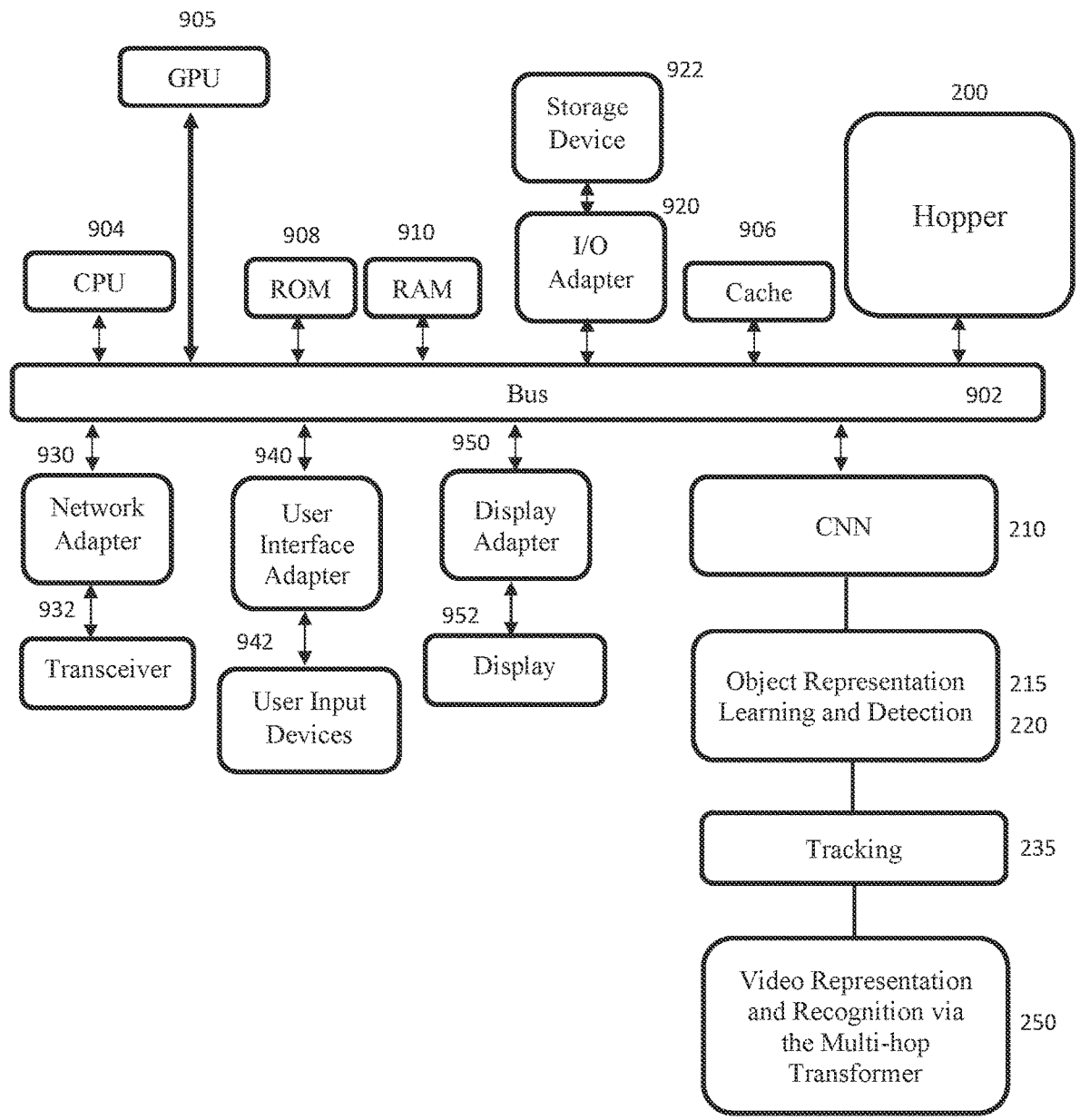
FIG. 6 is an exemplary processing system for employing the multi-hop transformer, in accordance with embodiments of the present invention.

FIG. 6 is an exemplary processing system for employing the multi-hop transformer, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, Hopper 200 can be employed via a CNN 210, object representation learning and detection 215, 220, tracking 235, and video representation and recognition via the Multi-hop Transformer 250.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
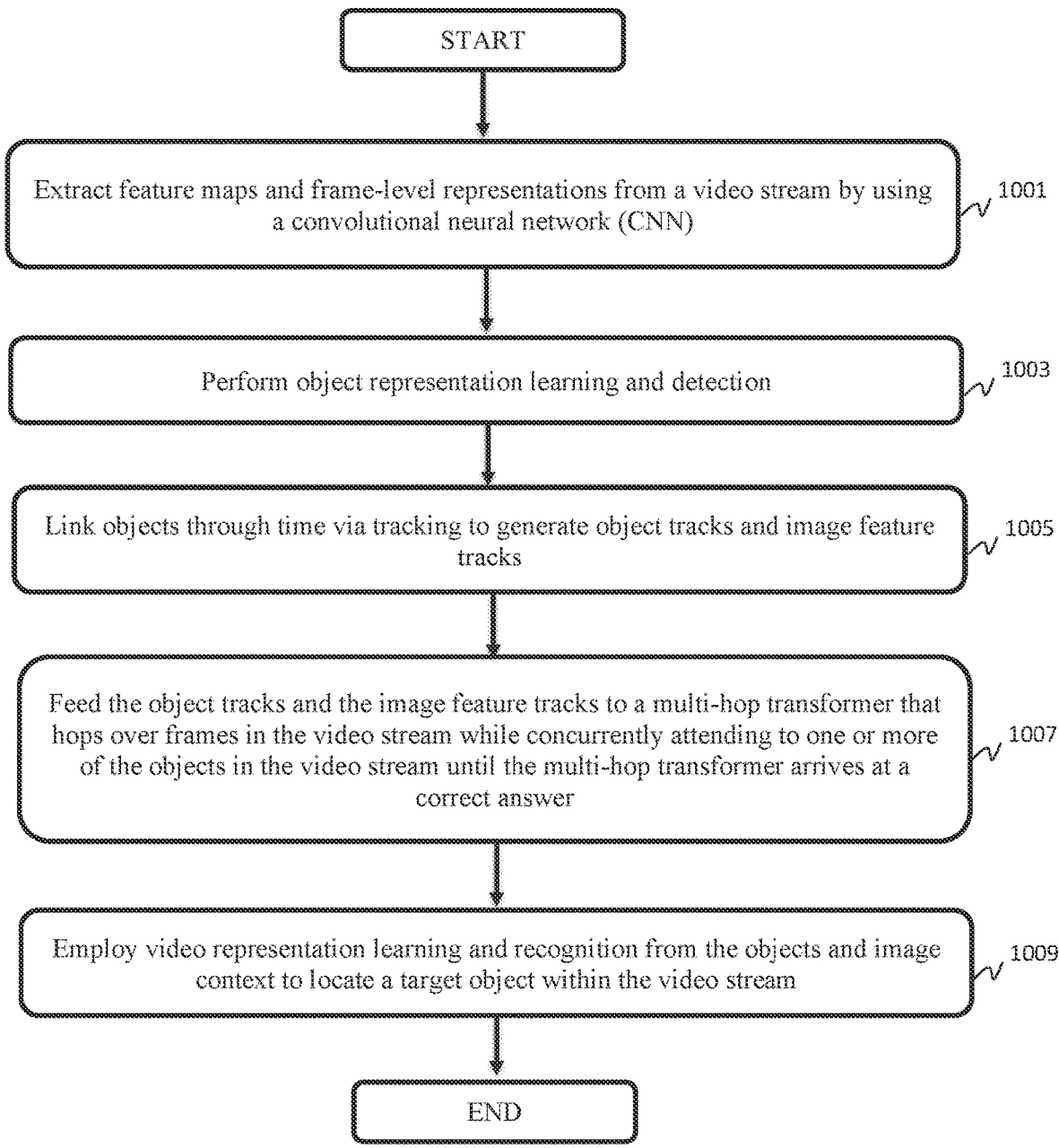
FIG. 7 is a block/flow diagram of an exemplary method for employing the multi-hop transformer, in accordance with embodiments of the present invention.

FIG. 7 is a block/flow diagram of an exemplary method for employing the multi-hop transformer, in accordance with embodiments of the present invention.

At block 1001, extract feature maps and frame-level representations from a video stream by using a convolutional neural network (CNN).

At block 1003, perform object representation learning and detection.

At block 1005, link objects through time via tracking to generate object tracks and image feature tracks.

At block 1007, feed the object tracks and the image feature tracks to a multi-hop transformer that hops over frames in the video stream while concurrently attending to one or more of the objects in the video stream until the multi-hop transformer arrives at a correct answer.

At block 1009, employ video representation learning and recognition from the objects and image context to locate a target object within the video stream.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for using a multi-hop reasoning framework to perform multi-step compositional long-term reasoning, the method comprising:
   extracting feature maps and frame-level representations from a video stream by using a convolutional neural network (CNN);
   performing object representation learning and detection;
   linking objects through time via tracking to generate object tracks and image feature tracks;
   feeding the object tracks and the image feature tracks to a multi-hop transformer that hops over frames in the video stream while concurrently attending to one or more of the objects in the video stream until the multi-hop transformer arrives at a correct answer; and
   employing video representation learning and recognition from the objects and image context to locate a target object within the video stream.

2. The method of claim 1, wherein spatial dimensions are collapsed into one dimension when performing the object representation learning and detection.

3. The method of claim 2, wherein a batch dimension is combined with a temporal dimension for the feature maps when performing the object representation learning and detection.

4. The method of claim 3, wherein positional encodings are learned for each time step and each resolution, and the feature maps are added in an element-wise manner to generate memory representations.

5. The method of claim 4, wherein the memory representations are fed to a transformer-based object detector outputting transformed object representations used as inputs to a multilayer perceptron (MLP).

6. The method of claim 5, wherein the transformer-based object detector accepts embeddings of object queries for every frame in the video stream.

7. The method of claim 6, wherein tracking involves determining an association between two objects from two consecutive frames of the video stream defined by object class agreement and a difference between two bounding boxes.

8. The method of claim 1, wherein multiple iterations over a single layer of the multi-hop transformer are run with a while loop.

9. The method of claim 8, wherein every iteration of the multiple iterations performs one hop of reasoning by selecting target objects of the one or more objects in select frames of the video stream.

10. The method of claim 9, wherein the hops operate in an auto-regressive manner.

11. A non-transitory computer-readable storage medium comprising a computer-readable program for using a multi-hop reasoning framework to perform multi-step compositional long-term reasoning, wherein the computer-readable program when executed on a computer causes the computer to perform the steps of:
   extracting feature maps and frame-level representations from a video stream by using a convolutional neural network (CNN);
   performing object representation learning and detection;
   linking objects through time via tracking to generate object tracks and image feature tracks;
   feeding the object tracks and the image feature tracks to a multi-hop transformer that hops over frames in the video stream while concurrently attending to one or more of the objects in the video stream until the multi-hop transformer arrives at a correct answer; and
   employing video representation learning and recognition from the objects and image context to locate a target object within the video stream.

12. The non-transitory computer-readable storage medium of claim 11, wherein spatial dimensions are collapsed into one dimension when performing the object representation learning and detection.

13. The non-transitory computer-readable storage medium of claim 12, wherein a batch dimension is combined with a temporal dimension for the feature maps when performing the object representation learning and detection.

14. The non-transitory computer-readable storage medium of claim 13, wherein positional encodings are learned for each time step and each resolution, and the feature maps are added in an element-wise manner to generate memory representations.

15. The non-transitory computer-readable storage medium of claim 14, wherein the memory representations are fed to a transformer-based object detector outputting transformed object representations used as inputs to a multilayer perceptron (MLP).

16. The non-transitory computer-readable storage medium of claim 15, wherein the transformer-based object detector accepts embeddings of object queries for every frame in the video stream.

17. The non-transitory computer-readable storage medium of claim 16, wherein tracking involves determining an association between two objects from two consecutive frames of the video stream defined by object class agreement and a difference between two bounding boxes.

18. The non-transitory computer-readable storage medium of claim 11, wherein multiple iterations over a single layer of the multi-hop transformer are run with a while loop.

19. The non-transitory computer-readable storage medium of claim 18, wherein every iteration of the multiple iterations performs one hop of reasoning by selecting target objects of the one or more objects in select frames of the video stream.

20. A system for using a multi-hop reasoning framework to perform multi-step compositional long-term reasoning, the system comprising:
   a memory; and
   one or more processors in communication with the memory configured to:
      extract feature maps and frame-level representations from a video stream by using a convolutional neural network (CNN);
      perform object representation learning and detection;
      link objects through time via tracking to generate object tracks and image feature tracks;
      feed the object tracks and the image feature tracks to a multi-hop transformer that hops over frames in the video stream while concurrently attending to one or more of the objects in the video stream until the multi-hop transformer arrives at a correct answer; and
      employ video representation learning and recognition from the objects and image context to locate a target object within the video stream.

* * * * *